Nov. 3, 1964 D. W. CROOKE 3,154,879
INSTANT SPINOUT HOOK REMOVER
Filed Aug. 27, 1963 2 Sheets-Sheet 1

Donald W. Crooke.

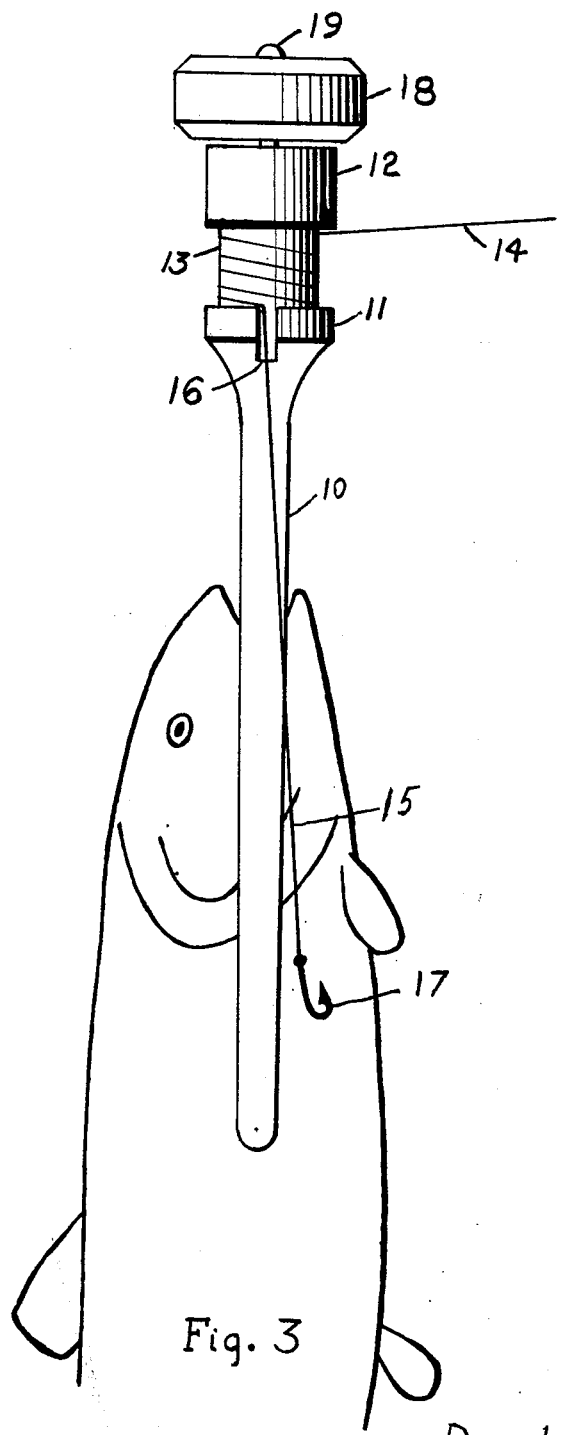
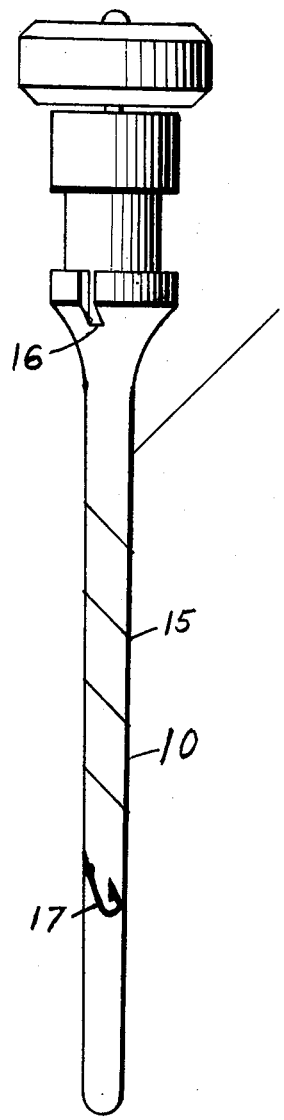
Fig. 3
Fig. 4
Donald W. Crooke.

United States Patent Office 3,154,879
Patented Nov. 3, 1964

3,154,879
INSTANT SPINOUT HOOK REMOVER
Donald W. Crooke, 511 21st Ave. S., Nampa, Idaho
Filed Aug. 27, 1963, Ser. No. 304,993
1 Claim. (Cl. 43—53.5)

This invention relates to fishing tackle and more particularly to a device for removing a fish hook from the mouth of a fish.

An object of this invention is to provide a quick, easy, and sure device for removing a fish hook from a fish that has swallowed the hook.

Another object is to provide a device for the removal of a fish hook from a fish without the necessity of groping about in the mouth of the fish no matter how deeply the hook is embedded.

Still another object of this invention is to provide a device of the character hereinafter described which facilitates the easy removal of a hook from the mouth of a fish in a minimum of time and with a minimum of effort even when used in the dark.

An advantage of the present invention is that it can be made of any desirable size or shape and can be made of any suitable material such as wood, plastic, metal, or any substance which has the required rigidity. If the device is made of metal it may be magnetized to add to its usefulness.

Further objects and advantages will become apparent from the following description taken in conjunction with the accompanying drawings in which:

FIG. 3 shows the device ready for use with the fishing line wound on the spool, the spindle and hook shown exteriorly of the fish to illustrate their relative positions.

FIG. 4 shows the device with the line wound upon the spindle subsequent to removal of the hook from the fish.

Figure 1:
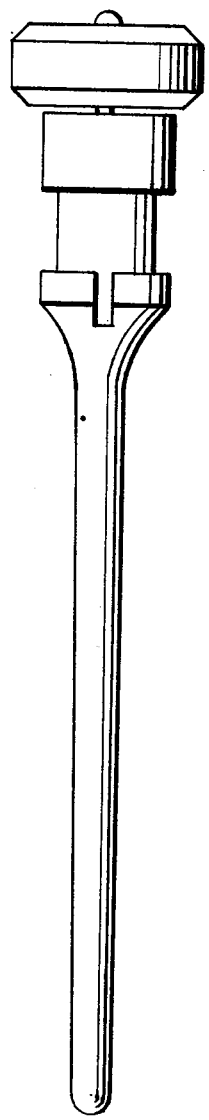
FIG. 1 is a side elevational view of the device.
Figure 2:
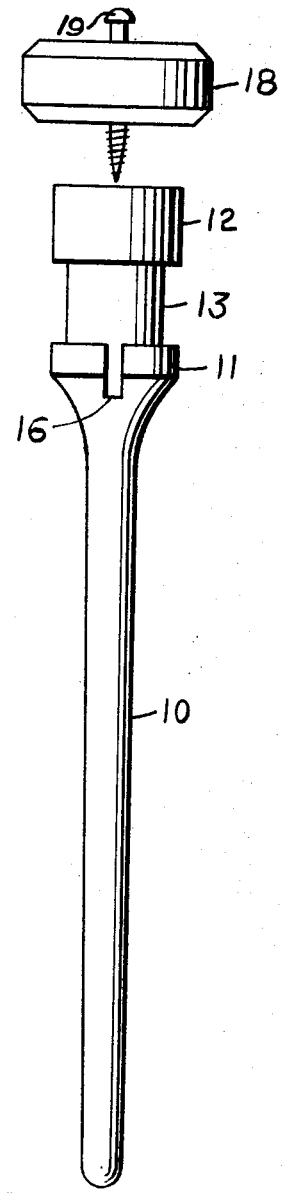
FIG. 2 is an exploded view of the device showing the various parts.

Referring more particularly to the drawings, in FIGS. 1 and 2 there is illustrated a preferred embodiment of the invention in the form of an elongated spindle, said spindle having a tapered lower end portion 10. The upper end portion of said spindle is recessed to form a spool with a hub 13 and spaced upper and lower flanged portions 12 and 11, respectively. The lower flanged portion 11 is provided with a notch 16 extending completely through the flange and parallel to the longitudinal axis of the spindle. Although only one notch 16 is illustrated the lower flanged portion 11 may be provided with a plurality of such notches. On the upper end of said spindle, adjacent the upper flanged portion 12, a nob 18 is rotatably secured by means of a screw or nail 19 which extends through the nob 18 and into the upper end of the spindle.

In operation, the tapered lower end portions 10 of the fish hook remover is inserted into the mouth of a hooked fish far enough to insure that the lowermost portion extends beyond the hook 17 as illustrated in FIG. 3. A portion of the fishing line 15 is then placed in the notch 16 and wound about the hub portion 13. The nob 18 is then held by one hand while a further portion of the line 14 which extends from the spool is pulled at a right angle to the spindle, thereby causing the spindle to rotate and wind the lower portion of the line 15 onto the tapered end portion 10 and thus pulling the hook to a position against the tapered end portion as illustrated in FIG. 4. It is to be understood that when the hook is pulled to a position against the tapered end portion it is also forced from the flesh of the fish.

I claim:

A fishhook remover comprising an elongated spindle having a tapered end adapted to be inserted into the mouth of a fish for engagement with a first line portion connected to said fishhook, the opposite end of said spindle terminating in spaced inner and outer flanged portions and an intermediate hub portion defining a spool for receiving another portion of said line, there being a notch in the inner of said flanged portions adjacent said spindle and adapted to receive an intermediate portion of said line, and a nob rotatably secured to said spool adjacent the endmost of said flanged portions, whereby said fishhook may be removed from the mouth of a fish by manually holding said nob and pulling on a further portion of said line extending from said spool to rotate said spindle and wind said fishhook and said first line portion thereon.

References Cited by the Examiner
UNITED STATES PATENTS 2,447,554  8/48  Bates _____ 43—53.5
2,897,626  8/59  Buller _____ 43—53.5

ABRAHAM G. STONE, *Primary Examiner.*
SAMUEL KOREN, *Examiner.*